US012065996B2

(12) United States Patent
Wiesböck et al.

(10) Patent No.: US 12,065,996 B2
(45) Date of Patent: Aug. 20, 2024

(54) METHOD FOR CREATING A SPARK ACROSS A SPARK GAP

(71) Applicant: GRABNER INSTRUMENTS MESSTECHNIK GMBH, Vienna (AT)

(72) Inventors: Johannes Wiesböck, Maissau (AT); Josef Lutz, Rohrau (AT)

(73) Assignee: GRABNER INSTRUMENTS MESSTECHNIK GMBH, Vienna (AT)

( * ) Notice: Subject to any disclaimer, the term of this patent is extended or adjusted under 35 U.S.C. 154(b) by 370 days.

(21) Appl. No.: 17/612,495

(22) PCT Filed: Apr. 22, 2020

(86) PCT No.: PCT/IB2020/053797
§ 371 (c)(1),
(2) Date: Nov. 18, 2021

(87) PCT Pub. No.: WO2020/234662
PCT Pub. Date: Nov. 26, 2020

(65) Prior Publication Data
US 2022/0228547 A1 Jul. 21, 2022

(30) Foreign Application Priority Data
May 23, 2019 (AT) .................................. A 195/2019

(51) Int. Cl.
*F02P 3/04* (2006.01)
*F02P 9/00* (2006.01)
*H01T 15/00* (2006.01)

(52) U.S. Cl.
CPC ............. *F02P 3/0428* (2013.01); *F02P 9/002* (2013.01); *H01T 15/00* (2013.01)

(58) Field of Classification Search
CPC .......... F02P 3/0428; F02P 3/01; F02P 3/0407; F02P 9/002; F02P 9/007; F02P 15/10; F02P 15/08; F02P 17/12; H01T 15/00
(Continued)

(56) References Cited

U.S. PATENT DOCUMENTS 7,404,396 B2 * 7/2008 Toriyama ................ F02P 15/08 123/655
9,617,965 B2 * 4/2017 Sanders ................ F02P 3/0838
(Continued)

FOREIGN PATENT DOCUMENTS

DE 2547397 A1 5/1977
DE 10121993 A1 11/2002
(Continued)

OTHER PUBLICATIONS

International Preliminary Report on Patentability dated Sep. 7, 2021, issued in corresponding International Patent Application No. PCT/IB2020/053797 (7 pgs.).
(Continued)

*Primary Examiner* — Hai H Huynh
(74) *Attorney, Agent, or Firm* — Pillsbury Winthrop Shaw Pittman, LLP

(57) ABSTRACT

In a method for creating a spark across a spark gap, in particular for igniting a flammable liquid to measure its flash point, by means of a spark generator which comprises an ignition transformer, wherein the spark generator, on the primary side of the ignition transformer, comprises at least one DC voltage source and, on the secondary side of the ignition transformer, comprises two electrodes delimiting the spark gap to be formed, wherein voltage pulses from the DC voltage source are applied to the ignition transformer on the primary side thereof, which voltage pulses generate ignition voltage pulses on the secondary side, the ignition
(Continued)

Figure 1:
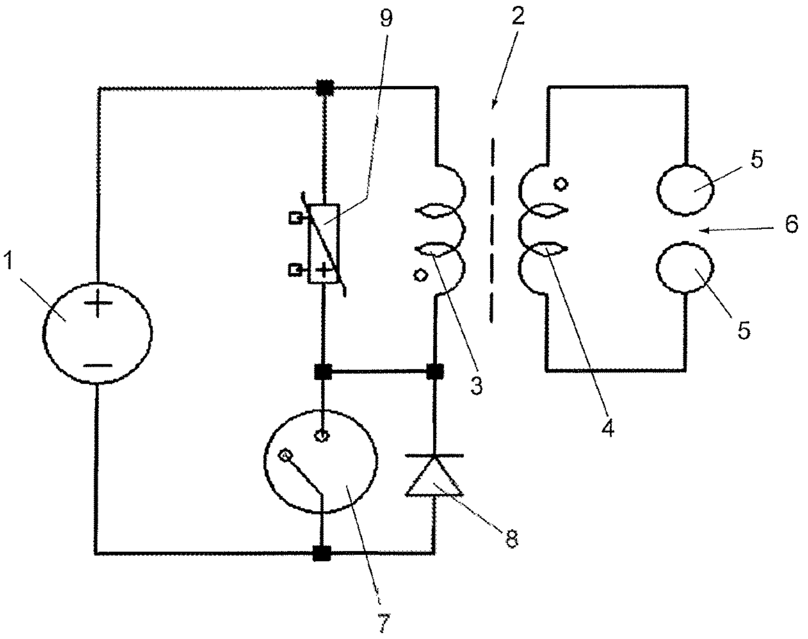

transformer is operated in a first phase according to the flyback converter principle and in a subsequent, second phase according to the forward converter principle.

22 Claims, 3 Drawing Sheets

(58) Field of Classification Search
USPC ................ 123/605, 644, 653, 654, 655, 656
See application file for complete search history.

(56) References Cited

U.S. PATENT DOCUMENTS

| | | | |
|---|---|---|---|
| 2007/0181110 | A1 | 8/2007 | Toriyama et al. |
| 2011/0144881 | A1 | 6/2011 | Glugla et al. |
| 2015/0167623 | A1 | 6/2015 | Sanders et al. |
| 2018/0358782 | A1 | 12/2018 | Miyake et al. |

FOREIGN PATENT DOCUMENTS

| | | | |
|---|---|---|---|
| DE | 102008042830 | A1 | 4/2010 |
| DE | 102014015486 | A1 | 3/2015 |
| DE | 112014002666 | T5 | 3/2016 |
| EP | 2639446 | A1 | 9/2013 |
| JP | 2012-127286 | A | 7/2012 |
| WO | 91/00961 | A1 | 1/1991 |
| WO | 2012/069358 | A2 | 5/2012 |

OTHER PUBLICATIONS

International Search Report dated Aug. 4, 2020, issued in corresponding International Patent Application No. PCT/IB2020/053797 w/English translation (7 pgs.).
Written Opinion of the International Searching Authority dated Aug. 4, 2020, issued in corresponding International Patent Application No. PCT/IB2020/053797 (7 pgs.).

* cited by examiner

METHOD FOR CREATING A SPARK ACROSS A SPARK GAP

CROSS-REFERENCE TO RELATED APPLICATIONS

This application is a national stage entry of PCT/IB2020/053797, filed Apr. 22, 2020, which claims priority to Austrian Application No. A 195/2019, filed May 23, 2019, the contents of each of which are herein incorporated by reference in their entireties.

The invention relates to a method for creating a spark across a spark gap, in particular for igniting a flammable liquid to measure its flash point, by means of a spark generator which comprises an ignition transformer, wherein the spark generator, on the primary side of the ignition transformer, comprises at least one DC voltage source and, on the secondary side of the ignition transformer, comprises two electrodes delimiting the spark gap to be formed, wherein voltage pulses from the DC voltage source are applied to the ignition transformer on the primary side thereof, which voltage pulses generate ignition voltage pulses on the secondary side.

The invention further relates to a device for carrying out this method, comprising an ignition transformer with a primary coil and a secondary coil, at least one DC voltage source arranged on the primary side, which is connected to the primary coil via a switch arrangement, and electrodes which are connected to the secondary coil and delimit the spark gap to be formed, wherein a control device for controlling the switches of the switch arrangement is further provided in such a way that the ignition transformer can be acted upon on the primary side with voltage pulses from the DC voltage source, said voltage pulses generating ignition voltage pulses on the secondary side.

Spark generators are used to create an ion channel by means of high-voltage pulses in a path between two electrically conductive materials (electrodes). The spark generated and the current flowing thereby lead to very strong heating in the area of the ion channel. This energy can be used to ignite flammable, especially gaseous substances in the vicinity of the spark. An application example for this is the active ignition in an internal combustion engine for gasoline.

The flash point of flammable liquids is measured using a very similar principle (see the standards ASTM D6450, ASTM D7094 etc.). In contrast to ignitions in internal combustion engines, where only safe ignition is required, certain parameters must be precisely defined for ignition tests during flash point measurements and kept constant in accordance with the values set and specified in the standards. These parameters include the ignition voltage, the transferred ignition power during spark burning, the spark duration and the total ignition energy transferred.

In the prior art, spark generators are known in which an ignition spark is generated by means of an ignition transformer using the flyback converter principle. FIG. 1 shows a corresponding circuit with a DC voltage source 1 and an ignition transformer 2, which comprises a primary coil 3 and a secondary coil 4. The secondary coil 4 has a multiple of the windings of the primary coil 3 in order to generate an ignition voltage in the kV range on the secondary side. The secondary coil is connected to electrodes 5, between which a spark gap 6 is to be formed. The primary coil 3 is acted upon by voltage pulses from the DC voltage source 1 by switching the switch 7 on and off, a flyback diode 8 being connected in antiparallel to the switch 7. Furthermore, a voltage-limiting element 9, in the present case a varistor, is arranged parallel to the primary coil 3.

The high voltage required for ignition is generated as follows. First the switch 7 is switched on and a current begins to build up in the primary coil 3 of the ignition transformer 2. The increase in the current is proportional to the supply voltage of the DC voltage source 1 and the inductance of the primary coil 3. If the current flow is interrupted by opening the switch 7, a very high voltage builds up on the primary coil 3, which voltage is limited by the varistor 9. This voltage spike is transmitted to the spark electrodes 5 in an even greater manner due to the transmission ratio of the ignition transformer 2. This creates a sparkover between the electrodes 5, which creates an ion channel and enables the subsequent spark burning.

The spark generator according to FIG. 1 works according to the flyback converter principle, because the energy transfer from the primary to the secondary side takes place mainly in the blocking phase in which the switch 7 is open. During the conducting phase, in which the switch 7 is closed, a magnetic field builds up in the air gap of the ignition transformer 2. The air gap supports energy storage and limits the increase in current. If the switch 7 opens, a voltage spike occurs and a voltage is induced in the secondary coil 4 while dissipating the stored magnetic field.

The advantage of the circuit according to FIG. 1 is its simplicity and the small number of components. However, it is very difficult to define the parameters required for an exact spark definition, such as the ignition voltage and the transmitted power, independently of one another and, if necessary, to vary them, because this would require a corresponding adaptation of the electrical components, namely the ignition transformer 2 and/or the varistor 9. In addition, especially after successful ignition, only a fraction of the energy stored in the primary coil is transferred to the secondary side. The greater part of the energy is destroyed in the varistor as thermal energy. This means that the proportion of energy that is transferred to the spark gap is in many cases only in the order of 10% of the total energy that has to be drawn from the voltage source. The varistor must be designed correspondingly large and the maximum energy and the pulse sequence for ignition must be limited.

Figure 2:
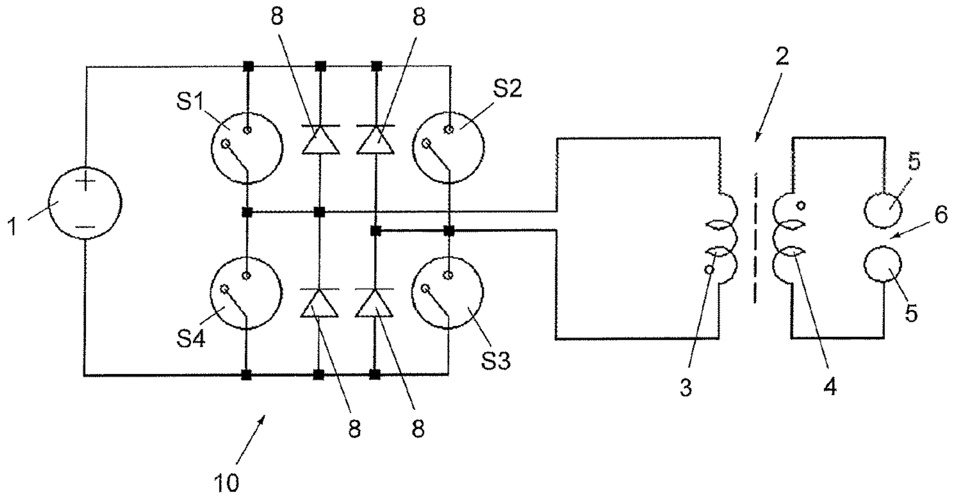

A significantly more efficient method of transforming energy to higher voltages is made possible by a transformer that works according to the forward converter principle. In this case, a switch arrangement, such as a switch bridge, is controlled in such a way that a (mostly symmetrical) alternating voltage is generated at the primary coil of the transformer. A corresponding circuit is shown in FIG. 2. The same parts are denoted by the same reference numerals as in FIG. 1. In contrast to FIG. 1, the DC voltage source 1 is connected to the primary coil 3 via a switch arrangement 10. The switch arrangement 10 is designed as a full bridge comprising the switches S1, S2, S3 and S4, the primary winding 3 of the transformer 2 being located between two half bridges of the switch bridge and therefore being able to be switched to the DC voltage source 1 in both directions. To this end, switches S1 and S3 or S2 and S4 are switched on at the same time (conducting phase). By cyclically changing these two switching states, the transformer 2 is operated with an alternating flow, wherein phases in which ail switches are open are provided between the respective conducting phases. In these phases, the current flows through the inductance of the transformer via the diodes through the DC voltage source. The transmitted power can be varied via the temporal relationship between the conducting phases and phases with open switches.

The embodiment shown in FIG. 2 is referred to as a push-pull converter. The disadvantage of the forward converter principle is that the high voltage required for ignition requires an extremely high transmission ratio. This requires a complex and expensive design and a lower efficiency of the ignition transformer as well as a critical control of the spark power as soon as the spark gap has been ignited.

The main challenge with a generation of sparks with well-defined performance parameters is the contradiction of the requirements for:

a) a high ignition voltage to form an ion channel between the electrodes and b) an accurate and efficient power transmission after the ion channel formation with a comparatively low burning voltage.

This makes the design of the electrical circuit and the ignition transformer complex and the results regarding power in the ignition spark depend heavily on the production parameters of the components if one of the methods described above is used. The results also depend heavily on the manufacturing tolerances, especially for the ignition transformer.

The present invention is therefore based on the object of providing a spark generator which meets the above-mentioned requirements without having to rely on extremely tight and expensive manufacturing tolerances for the ignition transformer and other components.

To achieve this object, the invention, in a method of the type mentioned at the outset, essentially consists in that the ignition transformer is operated in a first phase according to the flyback converter principle and in a subsequent second phase according to the forward converter principle. The essential idea of the invention is therefore to implement the two above-mentioned control variants in a single circuit. In a first phase, a number of high-voltage pulses are generated which are used to generate a flashover and thus an ion path between the electrodes. In the first phase, the advantage of the flyback converter principle is used, which lies in the efficient generation of high voltage peaks, whereby the lack of the possibility of precise control of the power transmission does not have a disruptive effect, since this phase is very short compared to the entire length of the spark.

After the start pulses, there is a switch to the flux converter mode for the second phase, so that the advantages of the forward converter principle can be exploited, which lie in the precise control of the power transmission, whereby the disadvantage of the less high voltage peaks no longer comes into play because the ion path has already been generated in the first phase. Due to the invention, the dimensioning of the ignition transformer can be made smaller and it is possible to compensate for the deviations in the power transmission caused by potential manufacturing tolerances of the ignition transformer by suitable control of the primary coil in the second phase with a view to compliance with the power transmission parameters specified by standards.

According to a preferred procedure it is provided that the voltage that builds up in the first phase on a primary coil of the ignition transformer in a blocking phase of the ignition transformer between two voltage pulses is limited by a voltage-limiting element. In order to achieve particularly high voltage peaks in the first phase in which the flyback converter mode is used, the limitation achieved by the voltage-limiting element can be set at a relatively high voltage. For example, a varistor with a relatively high threshold voltage can be used. At least one Zener diode can also be used as a voltage-limiting element, it being possible to provide two Zener diodes connected in series and polarized in opposite directions.

Furthermore, it is necessary to isolate the high voltages occurring during operation as a flyback converter in the blocking phase from the DC voltage source and other low voltage potentials of the circuit. For this purpose, it is provided that, in addition to the switches of the switch arrangement provided for generating the voltage pulses, a further switch is provided which, in the first phase, separates the primary coil from the DC voltage source between two voltage pulses. In addition, it can be provided that the switches of the switch arrangement provided for generating the voltage pulses are each assigned a flyback diode in parallel.

According to a preferred procedure, the ignition transformer is acted upon in the first phase with successive voltage pulses of the same polarity. However, it would also be possible to apply successive voltage pulses of alternating polarity to the ignition transformer in the first phase, which, however, would require a larger number of components, in particular expensive high-voltage components. In the second phase, the ignition transformer is preferably acted upon with successive voltage pulses of alternating polarity. In particular, the ignition generator is designed as a push-pull converter for generating the voltage pulses on the primary side having alternating polarity.

The polarity reversal of the ignition transformer can take place, depending on the circuit variant, by cyclically reversing the polarity of the primary winding of the ignition transformer or by switching between two oppositely polarized primary windings. In any case, the ignition transformer experiences alternating magnetic flux, whereby the magnetic circuit of the ignition transformer, in contrast to the single-ended flux converter, is used for energy transfer in both directions, i.e., by a positive and a negative flux. Accordingly, a demagnetizing winding can be dispensed with, since this task is taken over by reversing the polarity of the flow.

With regard to the generation of the voltage pulses, a preferred embodiment of the invention can provide that the frequency of the voltage pulses applied on the primary side is selected to be lower in the first phase than in the second phase.

In particular, the frequency of the voltage pulses applied in the second phase can be selected to maintain a predetermined transmitted ignition power, whereas the frequency of the voltage pulses applied in the first phase can be selected with the aim of reliably generating an ion path. In particular, it can be provided here that the frequency of the voltage pulses applied on the primary side in the first phase is at most ⅔, preferably at most half the frequency of the voltage pulses applied on the primary side in the second phase.

The pulse duration of the voltage pulses can also be adjusted in order to optimize the effect to be achieved in the respective phase. A preferred embodiment provides that the pulse duration of the voltage pulses applied on the primary side is selected to be greater in the first phase than in the second phase.

In particular, the pulse duration of the voltage pulses applied on the primary side in the first phase can correspond to at least 1.5 times, preferably at least 2 times the pulse duration of the voltage pulses applied on the primary side in the second phase.

Overall, the operation of the ignition transformer according to the forward converter principle allows the parameters of the ignition process in the second phase to be precisely regulated, with at least one parameter selected from ignition voltage, transmitted ignition power during spark burning, spark duration and total transmitted ignition energy being measured and a deviation from a corresponding setpoint being determined and wherein the deviation is reduced or eliminated by changing the pulse frequency and/or the duty cycle of the primary-side voltage pulses.

According to a second aspect, the present invention relates to a spark generator which comprises an ignition transformer with a primary coil and a secondary coil, at least one DC voltage source arranged on the primary side, which is connected to the primary coil via a switch arrangement, and electrodes which are connected to the secondary coil and delimit the spark gap to be formed, wherein a control device for controlling the switches of the switch arrangement is further provided in such a way that the ignition transformer can be acted upon on the primary side with voltage pulses from the DC voltage source, said voltage pulses generating ignition voltage pulses on the secondary side. According to the invention, the control device is designed to generate the voltage pulses in such a way that the ignition transformer can be operated in a first phase according to the flyback converter principle and in a subsequent second phase according to the forward converter principle.

The switch arrangement is preferably designed to apply successive voltage pulses of the same polarity to the ignition transformer in the first phase and to apply successive voltage pulses of alternating polarity in the second phase. Alternatively, successive voltage pulses of alternating polarity can also be generated in the first phase, but this is less economical.

According to a further preferred embodiment, a voltage-limiting element is assigned to the primary coil, in order to limit the voltage that builds up on the primary coil in a blocking phase between two voltage pulses of the ignition transformer in the first phase. The voltage-limiting element can be designed as a varistor, for example, or can be formed from at least one Zener diode.

In particular, the ignition generator can be designed as a push-pull converter, particularly preferably as a push-pull converter with full-bridge control.

For this purpose, the switch arrangement preferably comprises a switch bridge, the switches of which are each assigned a flyback diode.

However, it is also possible to avoid a switch bridge, but this requires the provision of two different voltage-limiting elements.

Another possibility for avoiding a full switch bridge is to arrange two supply voltages instead of a single supply voltage.

As far as the control of the switch arrangement for generating voltage pulses is concerned, there are various possibilities for influencing the ignition-specific parameters, as has already been explained in connection with the method according to the invention.

Provision is preferably made here that the control device for controlling the switch arrangement is designed such that the frequency of the voltage pulses applied on the primary side is lower in the first phase than in the second phase.

Furthermore, the control device for controlling the switch arrangement is preferably designed such that the frequency of the voltage pulses applied on the primary side in the first phase is at most ⅔, preferably at most half, the frequency of the voltage pulses applied on primary side in the second phase.

According to another preferred embodiment, the control device for controlling the switch arrangement is designed such that the pulse duration of the voltage pulses applied on the primary side is greater in the first phase than in the second phase.

In particular, the control device for controlling the switch arrangement can be designed such that the pulse duration of the voltage pulses applied on the primary side in the first phase corresponds to at least 1.5 times, preferably at least 2 times the pulse duration of the voltage pulses applied on the primary side in the second phase.

Figure 3:
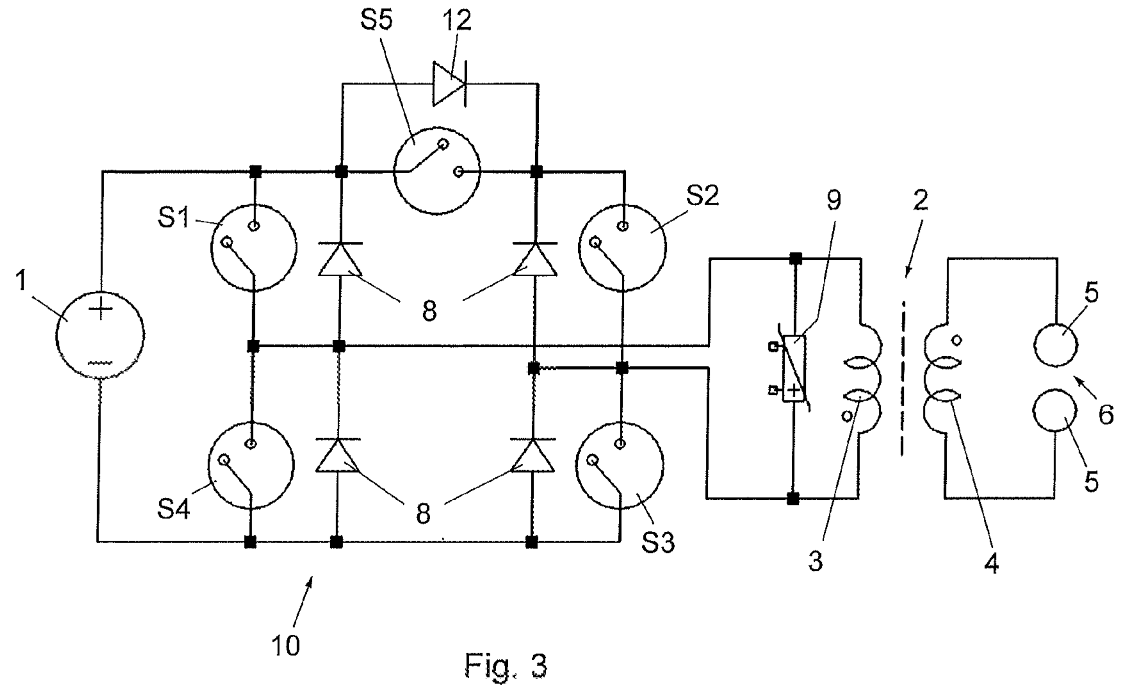
Figure 4:
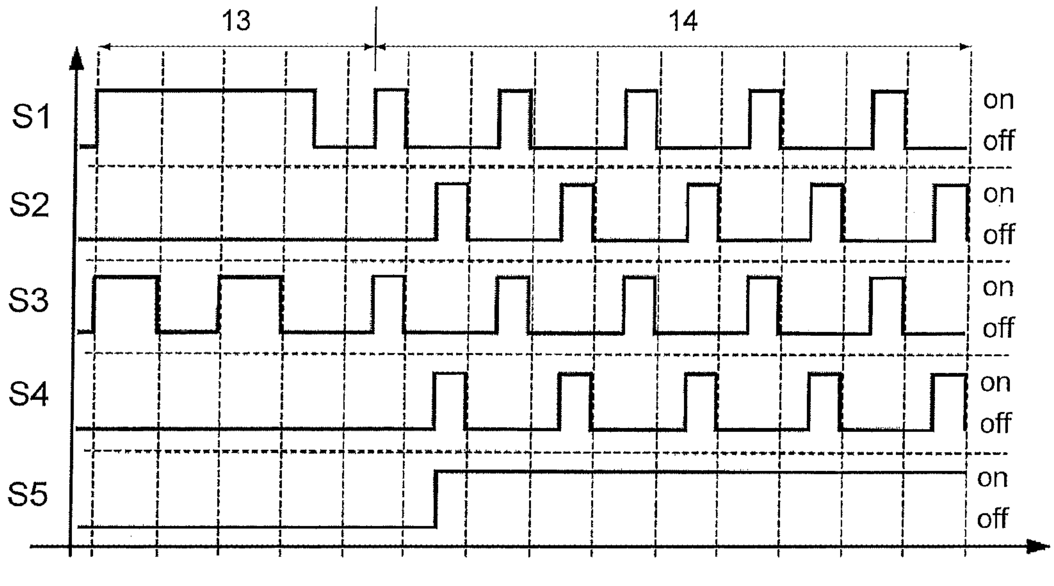
Figure 5:
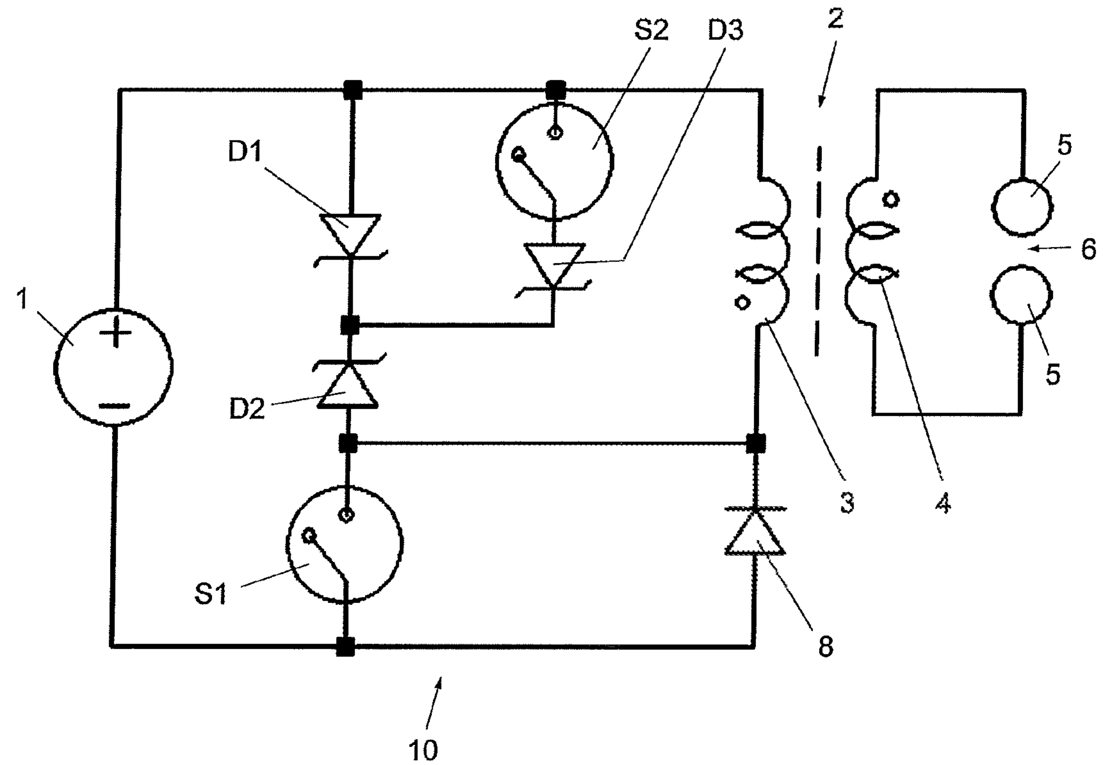
Figure 6:
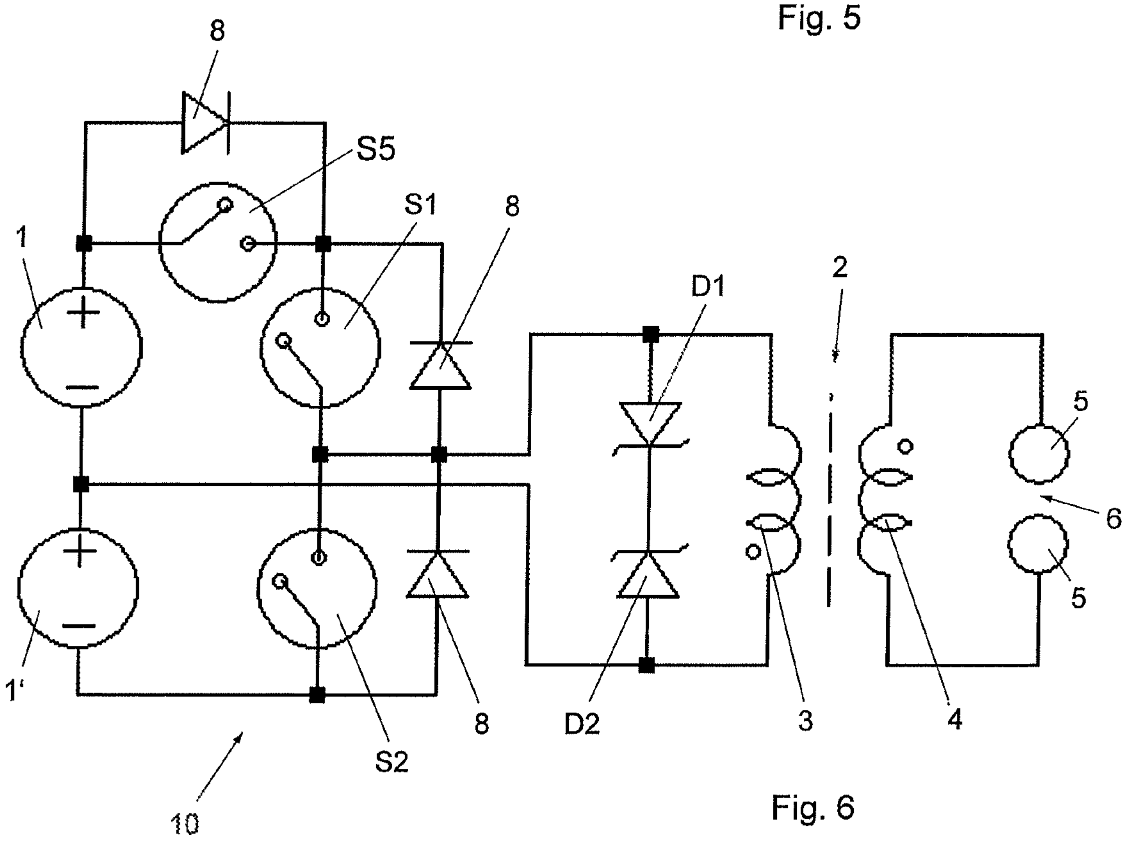

The invention is explained in more detail below with reference to exemplary embodiments shown schematically in the drawing. FIGS. 1 and 2 show embodiments according to the prior art, FIG. 3 shows a circuit diagram of a design of a spark generator according to the invention. FIG. 4 shows the sequence of switching states of the switches of the switch arrangement of the spark generator of FIG. 3, FIG. 5 shows a circuit diagram of a modified embodiment of the spark generator; and FIG. 6 shows a circuit diagram of a further modified embodiment of the spark generator.

With regard to the description of FIGS. 1 and 2, reference is made to the introductory section of the application.

FIG. 3 shows a circuit with a DC voltage source 1 and an ignition transformer 2, which comprises a primary coil 3 and a secondary coil 4. The secondary coil 4 has a multiple of the windings of the primary coil 3 in order to generate an ignition voltage in the kV range on the secondary side. The secondary coil 4 is connected to electrodes 5, between which a spark gap 6 is to be formed. The DC voltage source 1 is connected to the primary coil 3 via a switch arrangement 10. The primary coil 3 can be subjected to voltage pulses from the DC voltage source 1 by activating the switch arrangement 10. The switch arrangement 10 is designed as a full bridge comprising the switches S1, S2, S3 and S4, the primary winding 3 of the ignition transformer 2 being located between two half bridges of the switch bridge and therefore being able to be switched to the DC voltage source 1 with alternating polarity. Furthermore, a voltage-limiting element 9, in the present case a varistor, is arranged parallel to the primary coil 3. A further switch S5 with an associated flyback diode 12 is arranged between switches S1 and S2 on the positive pole side of DC voltage source 1.

The diagram according to FIG. 4 shows the sequence of the switch positions of switches S1, S2, S3, S4 and S5. The first phase is denoted by 13 and comprises the first two pulses that are generated by opening and closing switch S3 twice when switch S1 is open. In this first phase, the ignition transformer is operated according to the flyback, converter principle to generate high-voltage peaks between the electrodes 5. A current increase is produced in the primary inductance via switches S1 and S3. Switching off the switch S3 generates a voltage peak which is limited by the varistor 9 and transmitted to the secondary side. The switch S5 must be switched off during the generation of the high-voltage peaks for the ignition and therefore, like the switch S3, takes over the isolation of the high voltage from the other low-voltage potentials. The maximum voltage at switches S1, S2 and S4 is essentially given by the supply voltage of DC voltage source 1.

Thereafter, the switch bridge is operated as a flux converter in the second phase 14 by the switches S1 and S3 as well as S2 and S4 are alternately switched on and off, while the switch S5 is closed, so that alternately voltage pulses of different polarity are applied to the primary coil 3. The respective switch-on times are preferably selected to be of the same length, since otherwise a constant field is formed in the ignition transformer, which can lead the transformer core to saturation. Overlapping switching of switches S1/S3 and S2/S4 must also be avoided, as this would cause a short circuit.

The maximum voltage peak is basically determined by the voltage at the varistor 9 and the transformation ratio of the ignition transformer 2. In practice, however, the capacities of the ignition transformer 2 and the electrodes 5 also play a decisive role. With the help of the pulse duration of the voltage pulses, these and other effects can largely be taken into account or compensated for.

The power transmitted after ignition can be set via the pulse frequency and the duty cycle (switch-on time/period) independently of the ignition voltage. With the help of the two parameters, above all, tolerances in the transformer with regard to the transformation ratio and the leakage inductances can be compensated.

In the context of the present invention, the term "switch" encompasses any design of switching elements, including electronic switching elements, such as bipolar transistors, FETs, IGBTs, thyristors and the like.

In the exemplary embodiment according to FIG. 3, the requirements relating to high blocking voltages and low capacitances are particularly high for switches S3 and S5. Therefore, in some applications it is preferred that instead of a single switch, different switches are connected in series or, in the case of high currents, also in parallel.

Any component that has a voltage-limiting effect can be used as a voltage-limiting element. A varistor or, alternatively, at least one Zener diode can be used. In particular, the use of corresponding Zener diodes can lead to significantly more constant voltages with a lower tendency to overvoltages when the switch S3 is switched off.

As far as the design of the ignition transformer is concerned, all of the listed circuit and design variants can also be equipped with an autotransformer.

The circuit shewn in FIG. 3 represents only one of several conceivable embodiments. In particular, the circuit example according to FIG. 3 represents a symmetrical control of the ignition transformer 2 with a single DC voltage source 1 for the supply. In principle, the same or a similar function can also be achieved with asymmetrical arrangements, for example by connecting the voltage-limiting element 9 on one side to the ground potential or to the supply voltage.

In a further alternative embodiment, it is basically also possible to bypass the switch bridge by using two different voltage-limiting elements, as shown in FIG. 5. Although this leads to a reduction in the number of components, it has the consequence that the efficiency is reduced by the losses (especially at D3). In this exemplary embodiment, Zener diodes D1, D2 and D3 are used as voltage-limiting elements.

In a further alternative embodiment, the full bridge of the switches can also be bypassed by using two supply voltages 1 and 1', as shown in FIG. 6. This allows the number of electronic components for the circuit to be reduced without reducing the efficiency of the power transmission.

The invention claimed is:

1. Method for creating a spark across a spark gap for igniting a flammable liquid to measure its flash point, by means of a spark generator which comprises an ignition transformer, wherein the spark generator, on a primary side of the ignition transformer, comprises at least one DC voltage source and, on a secondary side of the ignition transformer, comprises two electrodes delimiting the spark gap to be formed, wherein voltage pulses from the at least one DC voltage source are applied to the ignition transformer on the primary side thereof, which voltage pulses generate ignition voltage pulses on the secondary side, characterized in that the ignition transformer is operated in a first phase according to the flyback converter principle and in a subsequent second phase according to the forward converter principle and that successive voltage pulses of the same polarity are applied to the ignition transformer in the first phase and that successive voltage pulses of alternating polarity are applied to the ignition transformer in the second phase.

2. The method according to claim 1, characterized in that voltage that builds up in the first phase on a primary coil of the ignition transformer in a blocking phase of the ignition transformer between two voltage pulses is limited by a voltage-limiting element.

3. The method according to claim 1, characterized in that the ignition generator is designed as a push-pull converter for generating the voltage pulses on the primary side having alternating polarity.

4. The method according to claim 1, characterized in that a frequency of the voltage pulses applied on the primary side is selected to be different in the first phase than in the second phase.

5. The method according to claim 4, characterized in that the frequency of the voltage pulses applied on the primary side in the first phase is at most ⅔ the frequency of the voltage pulses applied on the primary side in the second phase.

6. The method according to claim 4, characterized in that the frequency of the voltage pulses applied on the primary side in the first phase is at most half, the frequency of the voltage pulses applied on the primary side in the second phase.

7. The method according to claim 1, characterized in that a pulse duration of the voltage pulses applied on the primary side is selected to be greater in the first phase than in the second phase.

8. The method according to claim 7, characterized in that the pulse duration of the voltage pulses applied on the primary side in the first phase corresponds to at least 1.5 times the pulse duration of the voltage pulses applied on the primary side in the second phase.

9. The method according to claim 7, characterized in that the pulse duration of the voltage pulses applied on the primary side in the first phase corresponds to at least 2 times the pulse duration of the voltage pulses applied on the primary side in the second phase.

10. The method according to claim 1, characterized in that power transmitted via the spark gap in the second phase is adjusted by varying pulse frequency and/or pulse duty factor of the voltage pulses on the primary side.

11. Spark generator for forming a spark across a spark gap for carrying out the method according to claim 1, comprising the ignition transformer with a primary coil and a secondary coil, the at least one DC voltage source arranged on the primary side, which is connected to the primary coil via a switch arrangement, and the two electrodes which are connected to the secondary coil and delimit the spark gap to be formed, wherein a control device for controlling switches of the switch arrangement is further provided in such a way that the ignition transformer can be acted upon on the primary side with the voltage pulses from the at least one DC voltage source, said voltage pulses generating the ignition voltage pulses on the secondary side, characterized in that the control device is designed to generate the voltage pulses in such a way that the ignition transformer can be operated according to the flyback converter principle in the first phase and can be operated according to the forward converter principle in the subsequent second phase and that the switch arrangement is designed to apply successive voltage pulses of the same polarity to the ignition transformer in the first phase and apply successive voltage pulses of alternating polarity to the ignition transformer in the second phase.

12. The spark generator according to claim 11, characterized in that a voltage-limiting element is assigned to the primary coil, in order to limit a voltage that builds up on the primary coil in a blocking phase between two voltage pulses of the ignition transformer in the first phase.

13. The spark generator according to claim 11, characterized in that the ignition generator is designed as a push-pull converter.

14. The spark generator according to claim 13, characterized in that the ignition generator is designed as a push-pull converter with full bridge control.

15. The spark generator according to claim 11, characterized in that the switch arrangement comprises a switch bridge, the switches of which are each assigned a flyback diode.

16. The spark generator according to claim 11, characterized in that, in addition to the switches of the switch arrangement provided for generating the voltage pulses, a further switch is provided which, in the first phase, separates the primary coil from the at least one DC voltage source between two voltage pulses.

17. The spark generator according to claim 11, characterized in that the control device for controlling the switch arrangement is designed such that a frequency of the voltage pulses applied on the primary side is lower in the first phase than in the second phase.

18. The spark generator according to claim 17, characterized in that the control device for controlling the switch arrangement is designed such that the frequency of the voltage pulses applied on the primary side in the first phase is at most ⅔ the frequency of the voltage pulses applied on primary side in the second phase.

19. The spark generator according to claim 17, characterized in that the control device for controlling the switch arrangement is designed such that the frequency of the voltage pulses applied on the primary side in the first phase is at most half, the frequency of the voltage pulses applied on primary side in the second phase.

20. The spark generator according to claim 11, characterized in that the control device for controlling the switch arrangement is designed such that a pulse duration of the voltage pulses applied on the primary side is greater in the first phase than in the second phase.

21. The spark generator according to claim 20, characterized in that the control device for controlling the switch arrangement is designed in such a way that the pulse duration of the voltage pulses applied on the primary side in the first phase corresponds to at least 1.5 times the pulse duration of the voltage pulses applied on the primary side in the second phase.

22. The spark generator according to claim 20, characterized in that the control device for controlling the switch arrangement is designed in such a way that the pulse duration of the voltage pulses applied on the primary side in the first phase corresponds to at least 2 times the pulse duration of the voltage pulses applied on the primary side in the second phase.

* * * * *